(12) United States Patent
Rodriguez Garcia et al.

(10) Patent No.: US 11,878,415 B2
(45) Date of Patent: Jan. 23, 2024

(54) TACTILE DEXTERITY AND CONTROL

(71) Applicant: Massachusetts Institute of Technology, Cambridge, MA (US)

(72) Inventors: Alberto Rodriguez Garcia, Cambridge, MA (US); Francois Robert Hogan, St-Jean-sur-Richelieu (CA)

(73) Assignee: Massachusetts Institute of Technology, Cambridge, MA (US)

( * ) Notice: Subject to any disclaimer, the term of this patent is extended or adjusted under 35 U.S.C. 154(b) by 276 days.

(21) Appl. No.: 17/097,228

(22) Filed: Nov. 13, 2020

(65) Prior Publication Data

US 2021/0146532 A1    May 20, 2021

Related U.S. Application Data

(60) Provisional application No. 62/935,676, filed on Nov. 15, 2019.

(51) Int. Cl.
*B25J 9/00* (2006.01)
*B25J 9/16* (2006.01)
(Continued)

(52) U.S. Cl.
CPC .......... *B25J 9/1612* (2013.01); *B25J 9/1633* (2013.01); *B25J 9/1664* (2013.01); *B25J 9/1669* (2013.01);
(Continued)

(58) Field of Classification Search
CPC ...... B25J 9/1612; B25J 9/1633; B25J 9/1664; B25J 9/1669; B25J 13/084; B25J 15/00;
(Continued)

(56) References Cited

U.S. PATENT DOCUMENTS 9,821,475 B1 * 11/2017 Lynn .................. F24S 23/74
10,335,947 B1 * 7/2019 Diankov .............. B25J 9/1687
(Continued)

FOREIGN PATENT DOCUMENTS

CN     102120326 A  *  7/2011
CN     108917830 A  *  11/2018
(Continued)

OTHER PUBLICATIONS

Donlon et al. "Gellim: A High-Resolution, Compact, Robust, and Calibrated Tactile-sensing Finger," Oct. 1, 2018-Oct. 5, 2018 (Year: 2018).*

(Continued)

*Primary Examiner* — Jonathan L Sample
*Assistant Examiner* — Byron Xavier Kasper
(74) *Attorney, Agent, or Firm* — Wolf, Greenfield & Sacks, P.C.

(57) ABSTRACT

Systems and methods relating to tactile dexterity and control are disclosed. In one embodiment, a method of manipulating an object based on tactile sensing includes sensing an object by receiving signals from a tactile sensor of an end effector of a robotic system in contact with the object, controlling a contact state by operating the end effector to enforce a desired contact condition between the end effector and the object, estimating a pose of the object based on the received signals, and planning at least one trajectory of the object based on the estimated pose of the object and a desired pose of the object.

38 Claims, 8 Drawing Sheets

(51) Int. Cl.
*G05B 19/4155* (2006.01)
*B25J 15/00* (2006.01)

(52) U.S. Cl.
CPC .......... *G05B 19/4155* (2013.01); *B25J 15/00* (2013.01); *G05B 2219/39001* (2013.01)

(58) Field of Classification Search
CPC ... B25J 9/0087; B25J 9/1694; G05B 19/4155; G05B 2219/39001; G05B 2219/40625
See application file for complete search history.

(56) References Cited

U.S. PATENT DOCUMENTS

| | | | |
|---|---|---|---|
| 10,800,045 B1* | 10/2020 | Jonas | B25J 17/0208 |
| 2013/0300537 A1 | 11/2013 | Bajo et al. | |
| 2013/0325181 A1 | 12/2013 | Moore | |
| 2014/0277742 A1 | 9/2014 | Wells et al. | |
| 2016/0016311 A1* | 1/2016 | Konolige | B25J 9/1664 901/30 |
| 2016/0075030 A1* | 3/2016 | Takahashi | B25J 9/1694 901/9 |
| 2017/0183047 A1* | 6/2017 | Takagi | B25J 9/1664 |
| 2018/0319601 A1 | 11/2018 | Brazeau et al. | |
| 2019/0084151 A1* | 3/2019 | Bai | B25J 9/1612 |
| 2019/0101465 A1 | 4/2019 | Buyuksahin | |
| 2019/0270197 A1* | 9/2019 | Wagner | B65G 1/1376 |
| 2019/0321969 A1* | 10/2019 | Tan | B25J 15/0608 |
| 2020/0055152 A1 | 2/2020 | Chavan Dafle et al. | |
| 2021/0101292 A1* | 4/2021 | Kuppuswamy | G01L 5/228 |

FOREIGN PATENT DOCUMENTS

| | | | |
|---|---|---|---|
| KR | 20060076293 A | * | 7/2006 |
| KR | 20060076293 A | * | 7/2006 |

OTHER PUBLICATIONS

Veiga et al., "In-Hand Object Stabilization by Independent Finger Control." Jun. 12, 2018 (Year: 2018).*
Izatt et al., "Tracking objects with point clouds from vision and touch," May 9, 2017-Jun. 3, 2017 (Year: 2017).*
Donlon et al., "GelSlim: A High-Resolution, Compact, Robust, and Calibrated Tactile-sensing Finger," Oct. 1, 2018-Oct. 5, 2018 (Year: 2018).*
PCT/US2020/060351, Feb. 5, 2021, International Search Report and Written Opinion.
PCT/US2020/060351, May 27, 2022, International Preliminary.
Dong et al., Maintaining grasps within slipping bounds by monitoring incipient slip. In: 2019 International Conference on Robotics and Automation (ICRA). May 2019; 3818-3824.
Izatt et al., Tracking objects with point clouds from vision and touch. In: 2017 IEEE International Conference on Robotics and Automation (ICRA), IEEE (2017) 4000-4007.
Li et al., Localization and manipulation of small parts using gelsight tactile sensing. In: 2014 IEEE/RSJ International Conference on Intelligent Robots and Systems, IEEE (2014) 3988-3993.
Veiga et al., In-hand object stabilization by independent finger control. arXiv preprint arXiv:1806.05031. 2018.
Veiga et al., Stabilizing novel objects by learning to predict tactile slip. In: 2015 IEEE/RSJ International Conference on Intelligent Robots and Systems (IROS), IEEE (2015) 5065-5072 2.

* cited by examiner

TACTILE DEXTERITY AND CONTROL

CROSS-REFERENCE TO RELATED APPLICATIONS

This application claims the benefit under 35 U.S.C. § 119(e) of U.S. provisional application Ser. No. 62/935,676, filed Nov. 15, 2019, the disclosure of which is incorporated herein by reference in its entirety.

FIELD

Disclosed embodiments are related to robotic systems, robotic manipulators, and robotic manipulation.

BACKGROUND

Vision-based feedback control is often used for controlling robotic manipulation of objects for tasks such as pick-and-place movement of objects. However, vision-based approaches have limitations in dexterous manipulation tasks such as object reorientation, object insertion, and/or many kinds of object use.

SUMMARY

In some embodiments, a method of manipulating an object based on tactile sensing includes sensing an object by receiving signals from a tactile sensor of an end effector of a robotic system in contact with the object, controlling a contact state by operating the end effector to enforce a desired contact condition between the end effector and the object, estimating a pose of the object based on the received signals, and planning at least one trajectory of the object based on the estimated pose of the object and a desired pose of the object.

In some embodiments, a robotic system includes at least one end effector comprising at least one tactile sensor and a processor operatively coupled to the at least one tactile sensor. The at least one end effector is configured to manipulate an object. The processor is configured to receive signals from the at least one tactile sensor, control a contact state by operating the at least one end effector to enforce a desired contact condition between the end effector and the object, estimate a pose of the object based on the received signals, and plan at least one trajectory of the object based on the estimated pose of the object and a desired pose of the object.

In some embodiments, at least one non-transitory computer-readable storage medium has encoded thereon executable instructions that, when executed, cause at least one processor to carry out a method of manipulating an object based on tactile sensing. The method includes sensing an object by receiving signals from a tactile sensor of an end effector of a robotic system in contact with the object, controlling a contact state by operating the end effector to enforce a desired contact condition between the end effector and the object, estimating a pose of the object based on the received signals, and planning at least one trajectory of the object based on the estimated pose of the object and a desired pose of the object.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
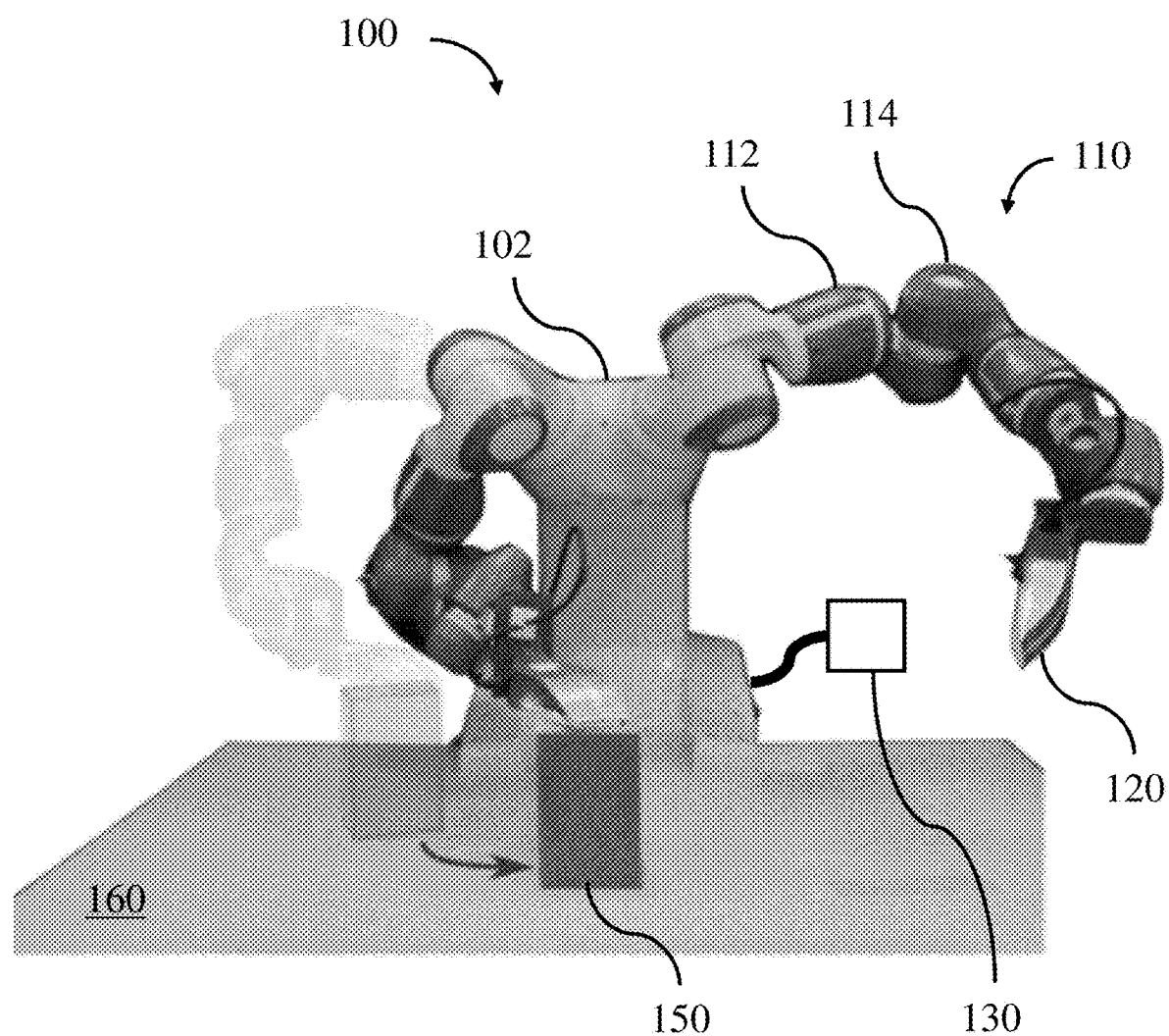
FIG. 1 depicts one embodiment of a robotic system.

Conventional approaches to robotic manipulation often rely on visual feedback. For example, a camera may track dedicated markers (e.g., fiducials) or visual features of an object to determine the position and/or orientation of the object. While vision-based systems may be associated with certain benefits in some applications, such systems are also limited. As one example, vision-based systems may be susceptible to occlusion events, in which the field of view of a camera is obscured, and the ability of the camera to properly sense an object of interest is interrupted. Of course, there are many other challenges and shortcomings associated with vision-based manipulation systems, with the above serving as just a single example.

Due in part to the limitations of vision-based approaches to robotic manipulation, the inventors have recognized and appreciated the benefits associated with tactile sensing for robotic manipulation. Without wishing to be bound by theory, the mechanics of object manipulation are driven primarily by the relative motions and forces at the frictional interfaces between the object, the end effector(s), and the environment. Tactile sensors may be able to localize contact geometry, detect contact motion, and infer contact forces. Accordingly, the inventors have found that a manipulation strategy that prioritizes the use of tactile sensors may be associated with certain benefits. Tactile-based manipulation strategies may enable more robust control by using more detailed and more varied sensor feedback, and may be desirable in environments that prove challenging for vision-based strategies, such as environments with poor lighting or a high chance of occlusion events.

First, a robotic system may sense contact with an object using a tactile sensor disposed on an end effector of the robotic system. The end effector may be operated to enforce a desired contact condition between the end effector and the object. As one example, the end effector may be operated to monitor slippage between the object and the end effector, and to adjust the contact state based on the monitored slippage. Based on signals received from the tactile sensor, the pose of the object may be estimated. An object trajectory may be planned and executed based on the estimated pose and a desired pose of the object. Of course, these steps may be repeated iteratively in a feedback control loop, such that the tactile sensor continually monitors the object as it is manipulated by the end effector, and the contact state, pose estimation, and object trajectory are continually updated.

One approach to tactile-based robotic manipulation may be based on planning for robot/object interactions that render interpretable tactile information for control. A robotic system may intentionally target contact interactions that produce tactile data with detailed geometric features (e.g., for estimation). There may be certain benefits associated with manipulating an object such that a tactile sensor contacts a corner or an edge of an object rather than a flat surface of the object, as a tactile sensor that contacts a corner or an edge of an object may produce a larger and/or more detailed set of sensor data than a tactile sensor that contacts a flat surface of an object. For example, sensing a corner or an edge of an object may provide useful information regarding the orientation of the object. If an object is known to have a certain geometry (e.g., if the object is a box), sensing that a straight edge of the object is aligned with a gravity vector (i.e., sensing that an edge of the box is vertically oriented) may indicate that a flat surface of the object (e.g., the bottom of the box) is parallel to a target surface (e.g., a table top). In contrast, sensing a flat surface of an object may not provide as useful orientation information. However, it should be appreciated that contacting a surface may be appropriate or desirable in some scenarios, and the present disclosure is not limited in regard to the parts of an object with which a tactile sensor or end effector may interact.

In some embodiments, a robotic system may reduce the complexity of a manipulation task by segmenting a trajectory into a sequence of simple interaction. A robotic system may intentionally target contact interactions that define dynamic systems with simple mechanics and efficient closed-loop policies (e.g., for control). A robotic system may be intentionally constrained to interact with an object through a finite set of interactions types, referred to herein as manipulation primitives. Each primitive may be designed to have a prescribed contact interaction between the end effector(s), the object, and the environment. Examples of manipulation primitives include a grasp, a push, a pivot, and a pull. Of course, other manipulation primitives are possible, and the disclosure is not limited in this regard.

The inventors have appreciated the benefits of structuring complex manipulation behavior as a combination of simpler manipulation primitives. Structuring of the manipulation problem into simpler behaviors may increase the freedom to design interactions for which the mechanics are more easily understood, for which the tactile information is more easily interpreted, and for which effective planning algorithms may be developed. For example, an offline graph-search task planner may sequence manipulation primitives, which may subsequently be executed in a closed-loop fashion by a robot. Planning may be accomplished in two steps: (1) searching for a sequence of manipulation primitives to accomplish a desired task, and (2) planning robot trajectories within a manipulation primitive to achieve a desired object transformation. These two steps are described below.

A search for a sequence of manipulation primitives may be formulated as a graph search problem. Nodes of a manipulation graph may represent possible object stable placements and edges of the graph may represent manipulation primitive actions transforming the object from one stable placement to another. An algorithm may be used to search for the shortest path within the constructed graph achieving the desired pose to pose reconfiguration. Examples of appropriate algorithms include but are not limited to Dijkstra's algorithm and A* algorithm.

After the graph search planner has determined a sequence of primitives, robot/object trajectories may be computed independently for each primitive. Primitive-specific planners may be used for increased frequency of trajectory regeneration, although primitive-agnostic planners may be appropriate as well. For the grasp and pull manipulation primitives, object motions that kinematically stick to the end effectors may be planned. For these primitives, the end effector pose trajectory may be determined by directly interpolating between initial and final poses of the object. For the pivot manipulation primitive, an interpolated object trajectory between the initial and final poses may be computed about a specified center of rotation. The end effector pose relative to the object that maintains a sticking interaction at all contacts may be found by solving the relevant governing equations. For the push motion primitive, a Dubins' car planner that computes the time-optimal trajectory connecting the initial and final object configurations with a single push may be used. Pushes on all sides of the object may be considered, and the trajectory with the shortest path may be executed.

Thus, the inventors have additionally appreciated the benefits associated with partitioning tactile-based robotic manipulation into (1) controlling a contact state between an end effector and an object and (2) controlling an object state in its environment. Such a closed-loop tactile control strategy may enable robust manipulation behavior in which the robot is able to react to external object perturbations.

Contact state control may include enforcing a desired contact condition (e.g., contact/no-contact, stick/slip) between an end effector and an object. For example, as a robot with two end effectors pivots an object, it may be desirable for both end effectors to maintain sticking contacts with the corners of the object. By monitoring incipient slippage, a controller may be able to engage when necessary to regulate the applied forces on the object to prevent further slippage. For example, the end effectors may rotate and/or apply additional normal force on the object in response to the controller detecting slippage.

If an objection experiences undesired slippage, the position and/or the orientation of the object may deviate from the desired trajectory, even if the contact state controller acts to prevent any further slippage. As such, an object state controller, running in parallel with the contact state controller, may be used to adjust a trajectory in response to object slippage.

Object state control may include tactile tracking and iterative replanning of the trajectories of the object, the end effector(s), and/or the robot. A tactile-based state estimator may track local features of an object in real-time and may update an estimate of the object pose accordingly. The updated object pose estimate may be used to continuously replan object, end effector, and robot trajectories.

In some embodiments, a method of manipulating an object based on tactile sensing may include sensing an object by receiving signals from a tactile sensor of an end effector of a robotic system in contact with the object, and subsequently controlling a contact state and controlling an object state. Controlling the contact state may include operating the end effector to enforce a desired contact condition between the end effector and the object. Controlling the object state may include estimating a pose of the object based on the received signals and planning a trajectory based on the estimated pose of the object and a desired pose of the object. The method may additionally include manipulating the object with the end effector according to the planned trajectory. It should be appreciated that this method (and other methods described herein) may be performed iteratively, such that after the object is moved and/or reoriented, the object may again be sensed by the tactile sensor, and a new trajectory may be planned.

In some embodiments, a robotic system comprises an end effector with a tactile sensor and a processor operatively coupled to the tactile sensor. The processor may be configured to receive signals from the tactile sensor, and to subsequently carry out a method of manipulating an object as described above. The signals from the tactile sensor may include information associated with a contact state between the tactile sensor and an object. The signals may include information associated with a normal force, a shear force, a force magnitude, and/or a force direction. Of course, it should be appreciated that, in some embodiments, a robotic system may include a plurality of end effectors, each of which may include a plurality of tactile sensors. As such, a processor may be operatively coupled to a plurality of tactile sensors and may be configured to integrate and coordinate the signals received from the different tactile sensors. It should be appreciated that the present disclosure is not limited in regard to the number and/or arrangement of tactile sensors.

In some embodiments, a robotic system may include an optical-based tactile sensor. An optical-based tactile sensor may, in some embodiments, include a deformable contact surface and an optical sensor. As the contact surface contacts an object, the contact surface may deform. The deformation of the contact surface may be sensed by the optical sensor, thereby enabling the tactile sensor to render high-resolution images of the contact surface geometry and/or strain field. For example, a robotic system may include a GelSlim sensor, which is an optical-based tactile sensor inspired by GelSight sensing techniques that images the deformation of an elastomeric material that is in contact with a target surface to provide high-resolution, three-dimensional surface topography information. It should be appreciated that the inventors have contemplated the use of other high-resolution vision-based tactile sensors, and that the present disclosure is not limited to GelSlim or GelSight-based sensors.

In addition to sensing contact with an object, a tactile sensor itself may in part determine the quality of the contact. For example, if an end effector only contacts an object via a tactile sensor disposed on the end effector, the physical properties of the tactile sensor may affect the quality of the contact. That is, a tactile sensor that includes a contact surface with a first geometry and/or a first material may interact with a given object differently than a tactile sensor that includes a contact surface with a second geometry and/or a second material. For example, a tactile sensor with a curved and rigid contact surface may make different types of contact with a given object compared to a tactile sensor with a flat and deformable contact surface. In some embodiments, a tactile sensor may include an elastomeric contact surface. An elastomeric contact surface may be elastic and deformable enough such that typical interactions with an object deform the sensor contact surface to a degree measurable by an optical sensor. At the same time, an elastomeric contact surface may be resilient enough such that the contact surface does not abrade, tear, or otherwise fail after a small number of uses. In some embodiments, the material of an elastomeric contact surface may be silicone, rubber, nitrile, thermoplastic elastomer, or any other suitable elastomeric material configured to exhibit appreciable deformation when contacting a surface. In some embodiments, a tactile sensor may be surface treated. For example, a contact surface may be treated with an anti-abrasive, although other types of surface treatments are contemplated, and the disclosure is not limited in this regard.

A tactile sensor may be configured to contact an object at more than one point, such that geometric features of the object may be resolved. As such, a tactile sensor may include a planar contact surface in some embodiments. However, depending in part on the shape of the object, other contact surface geometries of the tactile sensor may be appropriate, such as a curved contact surface. It should be appreciated that the geometry of a contact surface of a tactile sensor is not limited in the present disclosure.

A robotic system may include any suitable number of limbs, as the disclosure is not limited in this regard. In some embodiments, a robotic system includes two limbs, each of which may include an end effector with one or more tactile sensors. A two-limb robotic system may manipulate an object between two end effectors without the aid of any other supporting surface. In some embodiments, a robotic system includes a single limb. A one-limb robotic system may manipulate an object using a single end effector and a separate supporting surface, such as the top of a table. An interface between the object and an end effector (or other portion of the robotic system) may be referred to herein as an active contact, whereas an interface between the object and an external surface (i.e., a surface other than a surface of the robotic system) may be referred to herein as a passive contact.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts one embodiment of a robotic system 100. The robotic system 100 includes a body 102 and two limbs 110. It should be appreciated that although a robotic system with two limbs is depicted in FIG. 1, a robotic system may have any suitable number of limbs, including one, two, three, four, or any other number of limbs, as the disclosure is not limited in this regard. Each limb 110 of the robotic system may include a plurality of limb segments 112 connected at joints 114. The limb 110 may be coupled to the body 102 at a proximal portion of the limb 110. The limb 110 may be coupled to an end effector 120 at a distal portion of the limb 110.

The robotic system 100 may be configured to manipulate an object 150. In some embodiments, the object 150 may be disposed on a surface 160, such as a top of a table. In embodiments in which an object is supported by a surface, the robotic system may manipulate the object using a single end effector. Without a supporting surface, the robotic system may manipulate the object using two or more end effectors. Of course, two or more end effectors may also be used to manipulate an object that is supported by a surface. Depending at least in part on the type of end effector, an object may be manipulated with a single end effector in some embodiments, as the disclosure is not limited in this regard.

In the embodiment of FIG. 1, the robotic system 100 includes a processor 130. The processor 130 may be coupled to sensors and/or actuators of the robotic system 100. The processor may be configured to receive signals from the sensors, process the received signals, and send commands to the actuators to move the various limb segments 112 of the limbs 110 and/or the end effectors 120. In some embodiments, the processor may be configured to operate an end effector to adjust a magnitude and/or a direction of an applied force between the end effector and an object. In some embodiments, a method of manipulating an object based on tactile sensing may be carried out by a processor executing instructions encoded on a non-transitory processor-readable storage medium associated with the processor. It should be appreciated that any method described herein may be carried out by a processor executing instructions encoded on a non-transitory processor-readable storage medium. Additionally, the processor and memory may be embodied by a processor and memory located on any portion of the robotic system and/or the processor and associated memory may be located remotely from the robotic system as the disclosure is not so limited. For example, one or more processors may be associated with the individual actuators, a central processor of the robotic system, a remotely located control system, combinations of the foregoing, and/or any other appropriate location as the disclosure is not limited to where or how a processor is located for executing the methods disclosed herein.

In some embodiments, the robotic system 100 may include actuators disposed in the joints 114. For example, a motor may be disposed in a joint 114 of the robotic system. In other embodiments, an actuator may be disposed in the body 102 of the robotic system, and a transmission may be used to transfer the output of the actuator to the limb. However, it should be understood that the current disclosure is not limited to any particular construction of a robotic limb with its associated actuators and joints.

In some embodiments, a robotic system may include other sensors in addition to the tactile sensors that may be associated with one or more end effectors. For example, a robotic system may include joint sensors (e.g., encoders), force/torque sensors, cameras, or other sensors. However, it should be appreciated that, while information from other sensors may be used in some embodiments, the methods and control strategies described herein may be configured to operate using only local sensing (e.g., using signals from one or more tactile sensors).

Figure 2A:
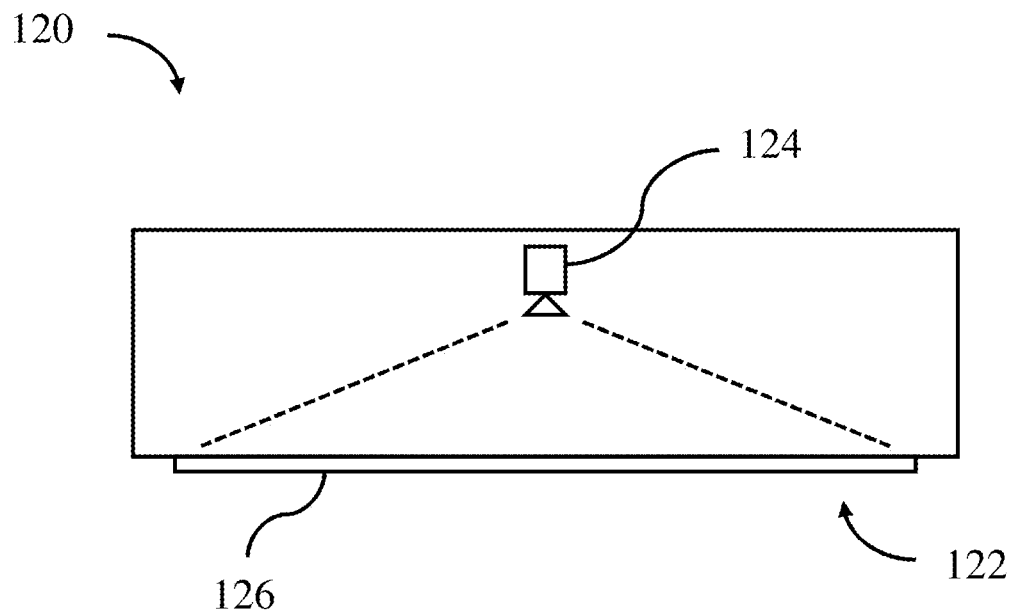
FIG. 2A is a front schematic view of one embodiment of an end effector.

FIG. 2A is a front schematic view of one embodiment of an end effector 120. The end effector includes a tactile sensor 122. The tactile sensor includes a contact surface 126 disposed on an external surface of the end effector 120. The contact surface 126 may be made of a deformable material such that when the contact surface 126 contacts an object, the contact surface 126 deforms by an appreciable amount such that the deformation may be sensed by an optical sensor 124 of the tactile sensor 122.

Figure 2B:
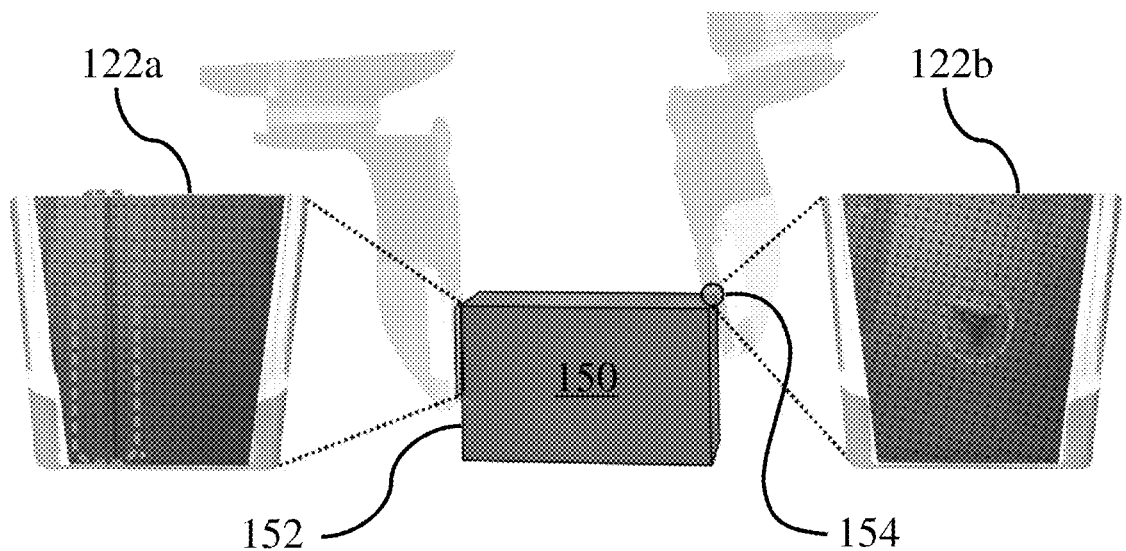
FIG. 2B depicts two end effectors manipulating an object.

FIG. 2B depicts two tactile sensors 122 contacting an object 150. A first tactile sensor 122a contacts the object 150 along an edge 152 of the object 150. A second tactile sensor 122b contacts the object 150 at a corner 154 of the object 150. As described above, it may be preferable for a tactile sensor to contact an object along an edge or at a corner in order to obtain more useful and/or more detailed contact data. However, contacting an object at another portion (e.g., a surface) is also contemplated, and the disclosure is not limited in this regard.

Figure 3A:
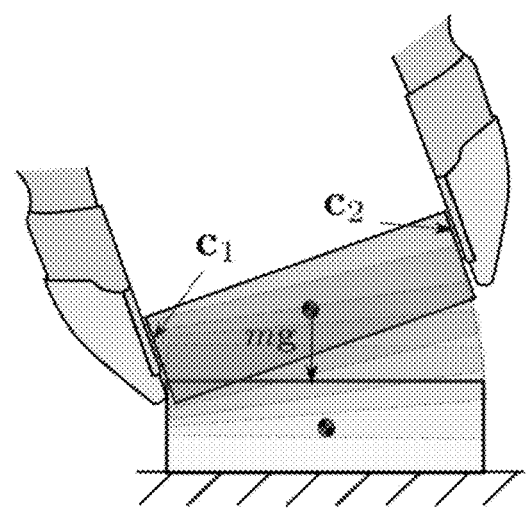
FIG. 3A depicts a grasp manipulation primitive.
Figure 3B:
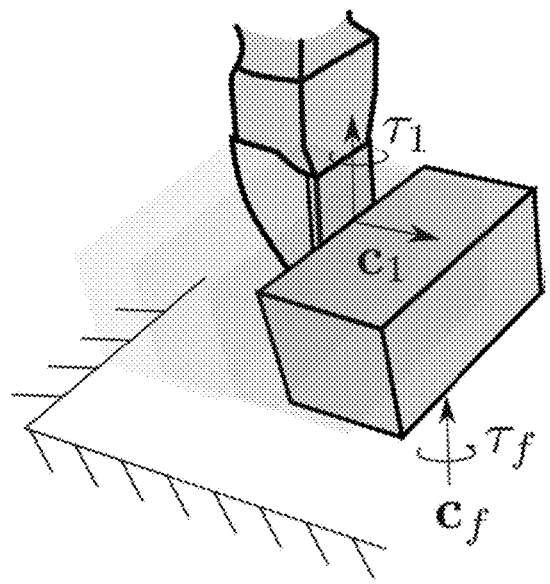
FIG. 3B depicts a push manipulation primitive.
Figure 3C:
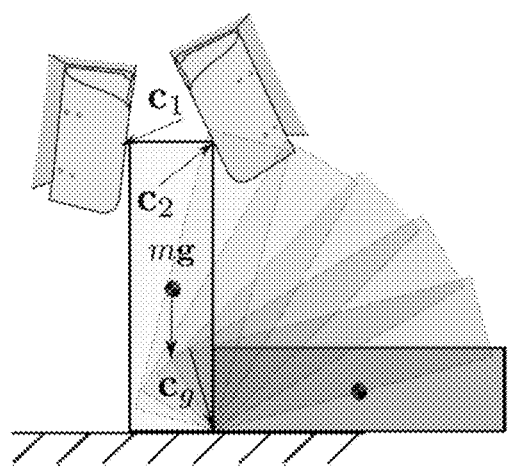
FIG. 3C depicts a pivot manipulation primitive.
Figure 3D:
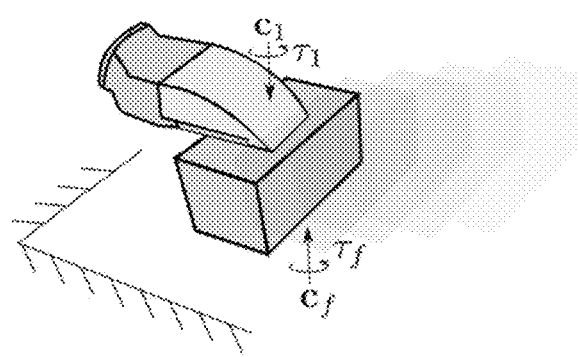
FIG. 3D depicts a pull manipulation primitive.

FIGS. 3A-3D depict different manipulation primitives. Specifically, FIG. 3A depicts a grasp, FIG. 3B depicts a push, FIG. 3C depicts a pivot, and FIG. 3D depicts a pull. A more in depth discussion of the manipulation primitives is described below (see "Example: Mechanics of Manipulation Primitives"). A grasp, as depicted in FIG. 3A, may include disposing two or more end effectors (or two or more surfaces of one or more end effectors) on opposing surfaces of an object, and moving the end effectors (or end effector surfaces) toward the object to apply a compressive force to the object. A push, as depicted in FIG. 3B, may include translating one or more end effectors to contact a side of an object supported by a surface (e.g., a table top), thereby manipulating the object within the plane of the surface. A pivot, as depicted in FIG. 3C, may include rotating an object about a point or an edge of the object in contact with a surface (e.g., a table top) by manipulating a portion of the object using two or more end effectors (or two or more surfaces of one or more end effectors). A pull, as depicted in FIG. 3D, may include applying a downward force with an end effector to a top of an object supported by a surface (e.g., a table top), and moving the end effector to manipulate the object within the plane of the surface.

Figure 4A:
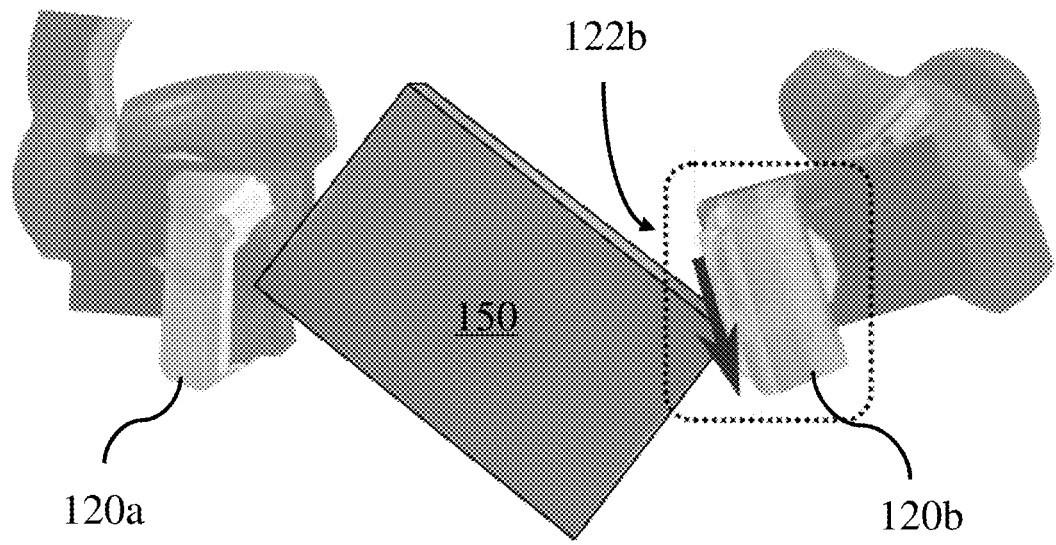
FIG. 4A depicts a robotic system detecting slippage of an object relative to an end effector.
Figure 4B:
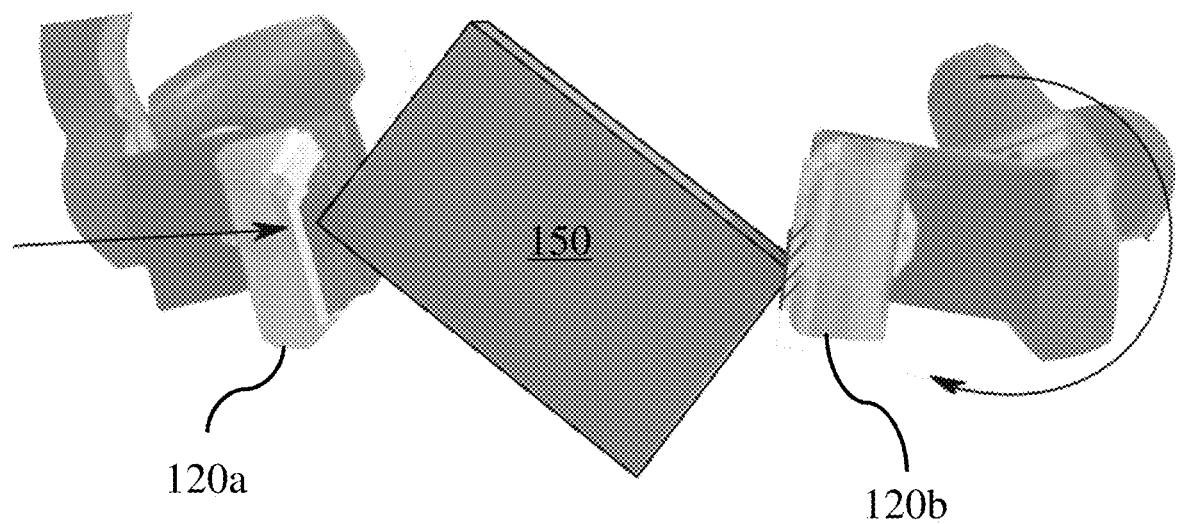
FIG. 4B depicts the robotic system of FIG. 4A reacting to the detected slippage.

FIGS. 4A-4B depict one example of contact state control. In FIG. 4A, a robotic system with first and second end effectors 120a and 120b manipulates an object 150. As slippage between the object 150 and the second end effector 120b occurs (indicated by the arrow in FIG. 4A), a processor receives signals from a tactile sensor 122b on the second end effector 120b and determines that slippage has occurred, prompting an adjustment in the contact state. Signals from a tactile sensor may include information associated with a position and/or orientation of the object relative to the tactile sensor. Slippage may be detected when the position and/or orientation of the object relative to the tactile sensor changes from a first measurement to a second measurement. In some embodiments, signals from a tactile sensor may include images or frames of an optical-based tactile sensor. If, upon comparing two or more frames, a tracked feature of the object is determined to be in a different location in one frame compared to another frame, slippage may be determined by the processor. The tracked feature may include a geometric feature of the object, such as an edge or a corner. FIG. 4B depicts the robotic system reacting to the detected slippage of FIG. 4A. Upon detecting slippage, the robotic system may adjust the contact state by adjusting operation of one or more of the robotic limbs. For example, the first end effector 120a may be commanded to increase the magnitude of the force it applies to the object 150 (indicated by the straight arrow in FIG. 4B), while the second end effector 120b may be commanded to rotate to adjust the direction of the force it applies to the object 150 (indicated by the curved arrow in FIG. 4B). Of course, each end effector may be commanded to adjust only the magnitude of its applied force, only the direction of its applied force, or both the magnitude and the direction of its applied force. An end effector may also be commanded to make no adjustments. Without wishing to be bound by theory, a frictional force between an end effector and an object may be associated with a magnitude of a normal force applied to the object, such that a greater normal force applied to an object may be associated with a increased frictional force. An increased frictional force may be associated with a stronger grasp, which may be associated with limiting slippage. A normal force applied to an object may be increased by increasing a magnitude of a total applied force (i.e., increasing both the normal and tangential applied forces) or by changing a direction of an applied force (i.e., increasing a normal applied force by decreasing a tangential applied force).

Figure 5:
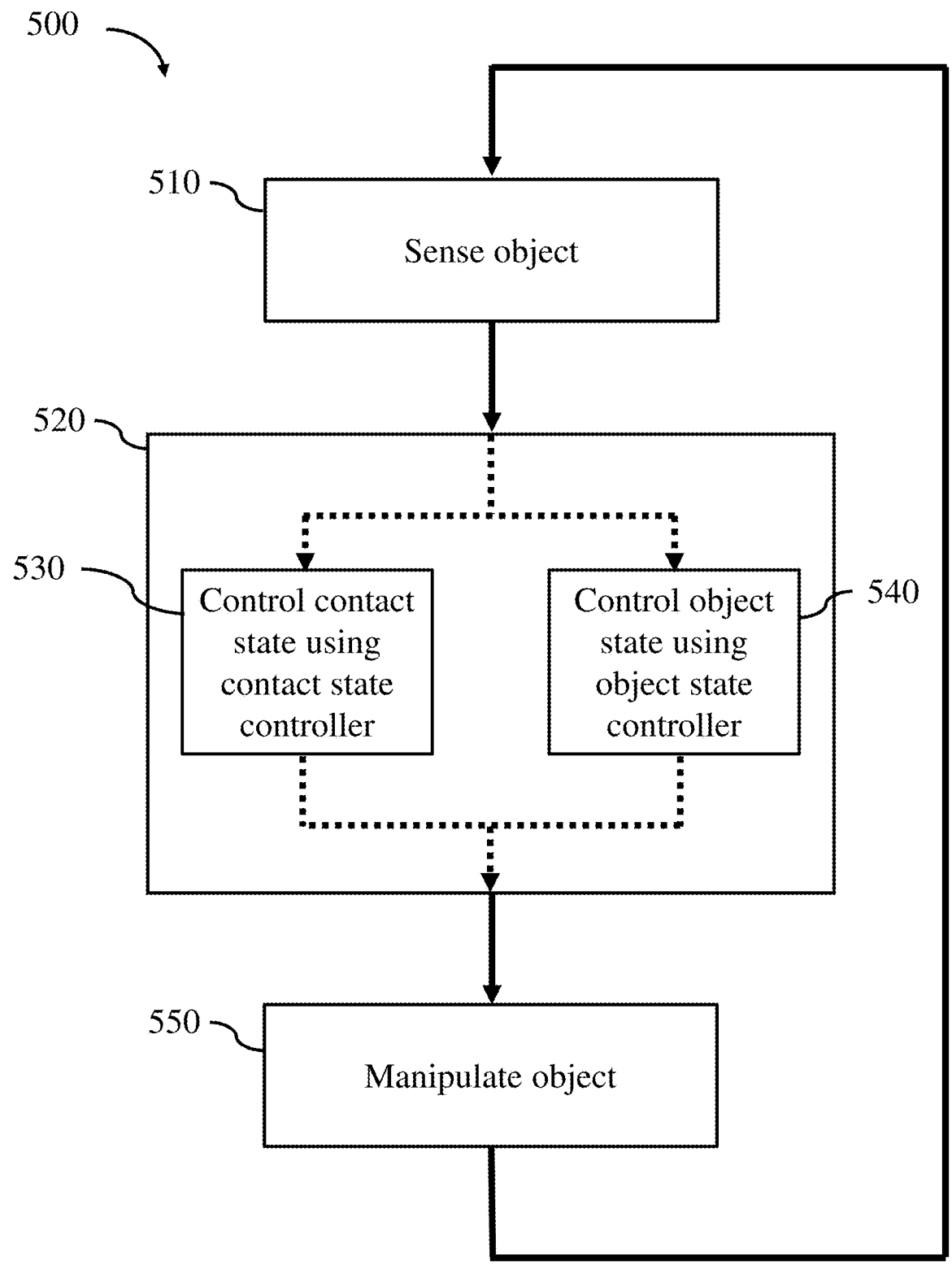
FIG. 5 is a flow diagram of one embodiment of a method of manipulating an object based on tactile sensing.

FIG. 5 is a flow diagram of one embodiment of a method 500 of manipulating an object based on tactile sensing. At 510, an object is sensed. In some embodiments, an object is sensed by receiving signals from a tactile sensor of an end effector of a robotic system in contact with the object. As described above, a tactile sensor may be an optical-based tactile sensor. Signals from an optical-based tactile sensors may include successive images or frames. At 520, the object is controlled. Controlling the object includes controlling the contact state (at 530) and controlling the object state (at 540). The contact state controller and the object state controller may run in parallel in some embodiments. One embodiment of a method of operating a contact state controller 530 is described in detail in FIG. 6, and one embodiment of a method of operating an object state controller 540 is described in detail in FIG. 7. After the object is controlled at 520, the object is manipulated at 550. Manipulating the object may include manipulating the object with one or more end effectors according to a planned trajectory. Manipulating the object may be associated with changing the position, orientation, pose, or other characteristic of the object. As such, the method 500 may be conducted iteratively, such that, after manipulation at 550, the object may again be sensed, as at 510.

Figure 6:
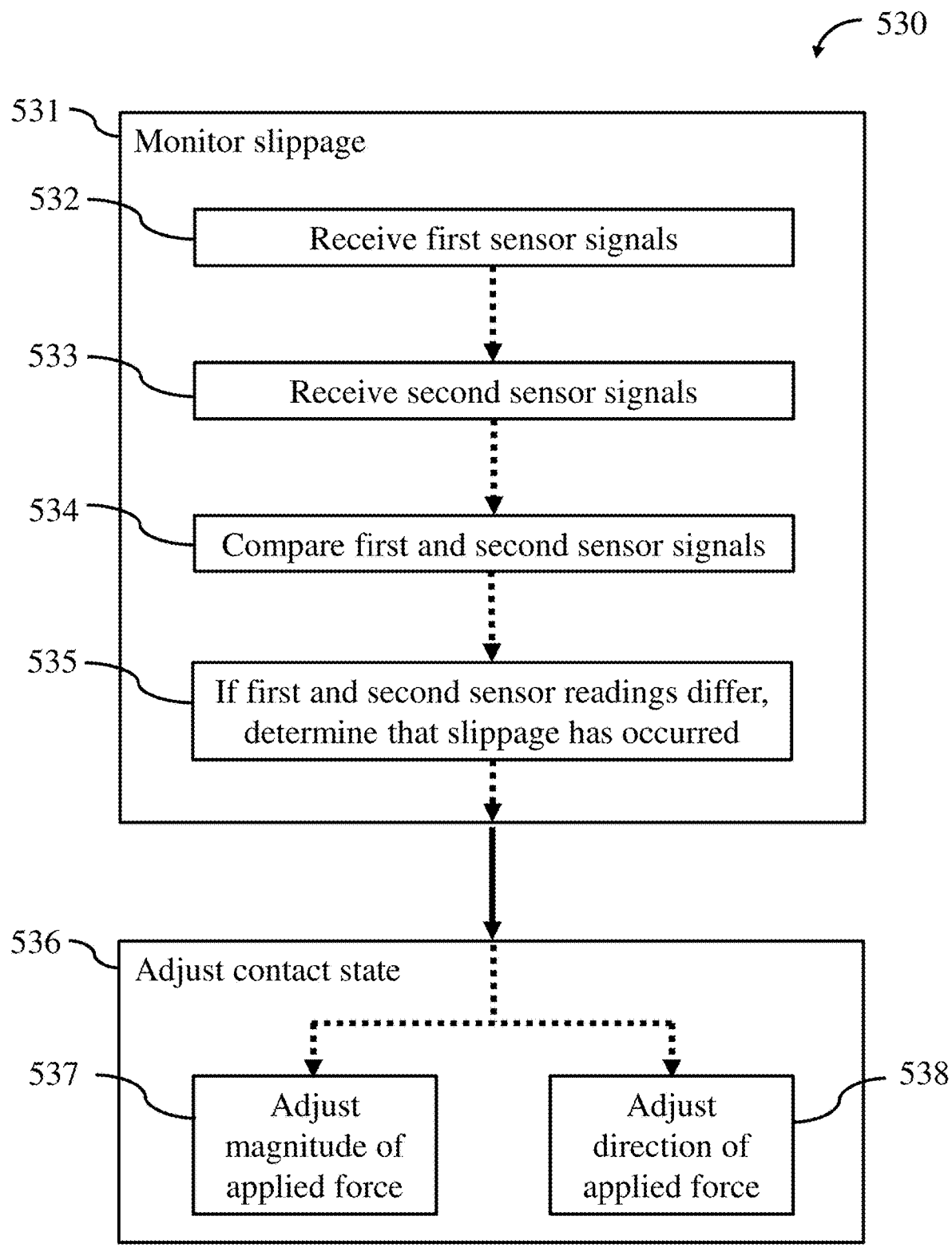
FIG. 6 is a flow diagram of one embodiment of a method of controlling a contact state.

FIG. 6 is a flow diagram of one embodiment of a method 530 of controlling a contact state. Controlling a contact state may include operating an end effector to enforce a desired contact condition between the end effector and an object. A desired contact condition may include a contact/no-contact condition or a stick/slip condition, although other contact conditions are contemplated, and the disclosure is not limited in this regard. Controlling a contact state may include monitoring slippage between an object and an end effector, as indicated at 531. Monitoring slippage may include receiving first signals associated with sensing an object at a first time (as indicated at 532), receiving second signals associated sensing the object at a second time (as indicated at 533), comparing the first and second sensor signals (as indicated at 534), and determining that slippage has occurred if the first and second sensor signals differ (as indicted at 535). In some embodiments, sensing the object (as at 510 of FIG. 5) may include receiving a plurality of frames from an optical-based tactile sensor. In these embodiments, monitoring slippage (as at 531 of FIG. 6) may include comparing two or more frames of the plurality of frames. If, upon comparing frames, a tracked feature of the object is determined to be in a different location in one frame compared to another frame, slippage may be detected. The tracked feature may include a geometric feature of the object, such as an edge or a corner. More generally, monitoring slippage may include detecting that a position and/or an orientation of an object relative to an end effector has changed. If slippage is detected, the contact state may be adjusted based on the monitored slippage at 536. The contact state may be adjusted by adjusting a magnitude of an applied force between the end effector and the object (as indicated at 537), or by adjusting a direction of the applied force (as indicated at 538), as described above.

Figure 7:
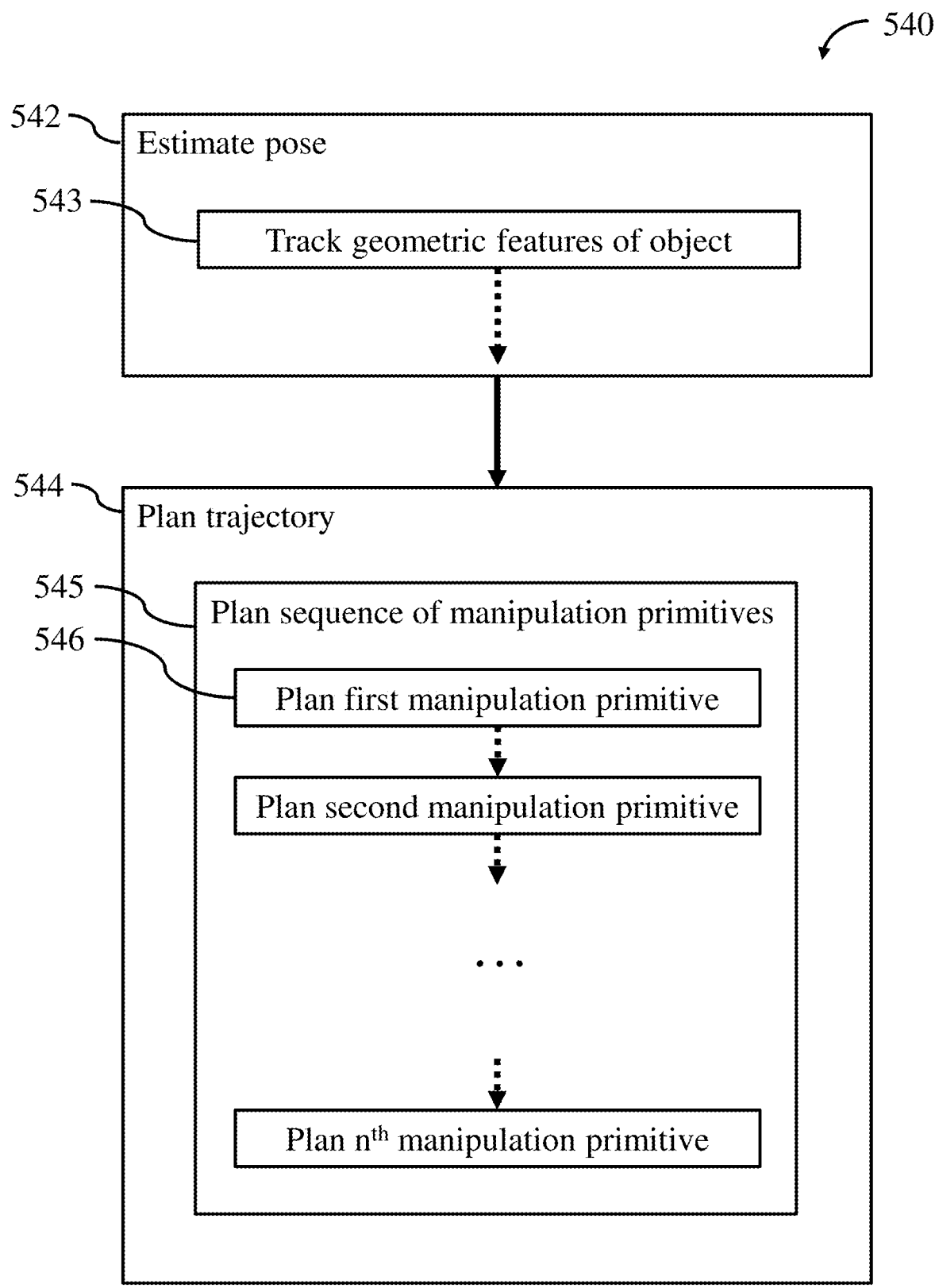
FIG. 7 is a flow diagram of one embodiment of a method of controlling an object state.

FIG. 7 is a flow diagram of one embodiment of a method 540 of controlling an object state. Controlling an object state may include estimating a pose of an object based on signals received from a tactile sensor, as indicated at 542. Estimating the pose of the object may include tracking at least one geometric feature of the object in real time, as indicated at 543. While any geometric feature may be tracked, it may be preferable in some embodiments to track an edge of the object or a corner of the object. One or more trajectories of the object may be planned, as at 544, based on the estimated pose of the object and a desired pose of the object. Planning a trajectory of an object may include planning end effector trajectories and/or robot trajectories. Trajectories may include a manipulation primitive, such as a grasp, a push, a pivot, or a pull, as described above in relation to FIGS. 3A-3D, and as indicated at 546. In some embodiments, a trajectory includes a sequence of manipulation primitives, as indicated at 545.

Figure 8:
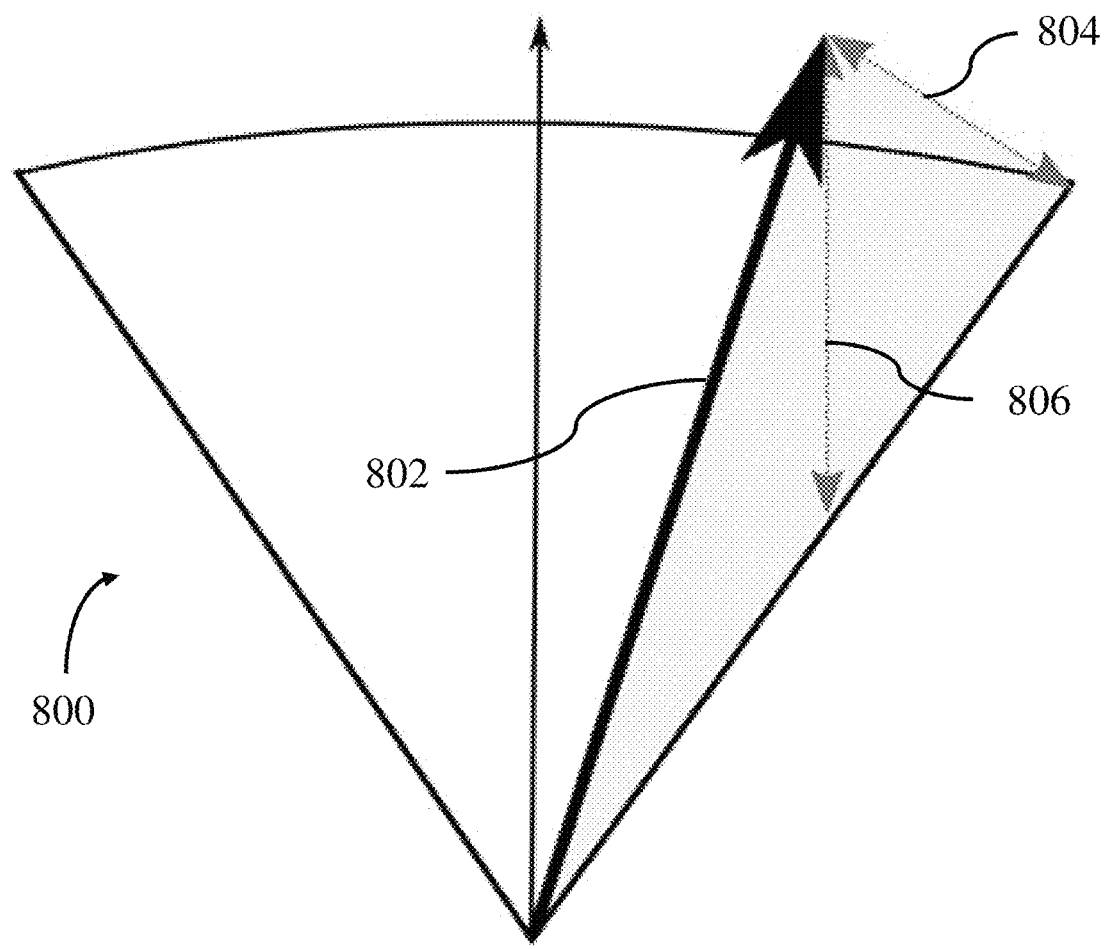
FIG. 8 is a schematic diagram of a friction cone.

FIG. 8 depicts a friction cone 800. Friction cones may aid in the understanding of when slip occurs. Generally, a friction cone is a visual representation of the relationship between the direction of an applied force and whether or not slip occurs. Without wishing to be bound by theory, there is no slippage when a contact force 802 lies within a friction cone 800. In contrast, slippage occurs when a contact force 802 lies on the boundary of the friction cone 800. More stable contacts may be associated with a contact force 802 nearer to the center of the friction cone 800.

One stability metric is the stability margin 804, which is one measure of how close a contact is to the slippage boundary. In some embodiments, a contact state controller may be configured to maximize a stability margin to discourage slippage. In some embodiments, a contact state controller may be configured to minimize a stability margin to encourage slippage. In some cases, a stability margin approximation 806 may be used in place of the stability margin 804. A more detailed discussion of the benefits of friction cones and their use in planning path trajectories of a robot manipulating an object may be found in U.S. Patent Application Publication No. 2020/0055152 (application Ser. No. 16/542,677), the entire contents of which are incorporated herein by reference in their entirety for all purposes.

Example: Mechanics of Manipulation Primitives

This example describes the mechanics of the four manipulation primitives shown in FIGS. 3A-3D. To model the relevant interactions, a number of assumptions may be made. These assumptions include known geometries of the object, the robot, and the environment; known coefficients of friction; rigid-body interaction; Coulomb's friction law; quasi-static interaction; and surface contacts with uniform pressure distribution. These simplifications will help in designing a fast trajectory planning algorithm. The unmodeled aspects of the interactions (e.g., non-uniform pressure distributions, inertial forces, deformation of contact, etc.) may be addressed by designing closed-loop tactile controllers that react to undesired contact events such as slip.

Assuming quasi-static interactions, force equilibrium dictates that contact forces on the object (applied by the end effector or the environment) are balanced by:

$$\sum_{i=1}^{C} G_i(q)^T w_i = w_{ext}, \qquad (1)$$

where $q=[p_o^T \ p_{p,l}^T \ p_{p,r}^T]T$ is the concatenation of the object pose and the left/right end effector poses, $w_i=[c_i^T \ \tau_i^T]^T$ is the applied wrench on the object by the $i^{th}$ contact in the contact frame, $w_{ext}$ is the external force applied by gravity in the world frame, $G_i$ is a grasp matrix transforming the coordinates of a contact wrench from the contact frame to the world frame, and C is the number of contacts.

Contact forces are constrained within the friction cone in accordance to Coulomb's frictional law. Denoting the normal and tangential components of the contact force as $c_i=[f_{n,i} \ f_{t,i}^T]^T$, we express Coulomb's frictional law as:

$$f_{n,i} \geq 0 \qquad (2)$$

$$|f_{t,i}| \leq \mu |f_{n,i}|. \qquad (3)$$

In the case of point contact interactions (e.g., a grasp or a pivot), the contact is unable to sustain frictional moments, implying $\tau_i=0$. For contacts modeled using surface contacts (push and pull), the surface is able to resist a certain amount of frictional moment. We model surface contacts using the limit surface, which describes the set of forces and moments that can be transmitted through the contact. In practice, we make use of an ellipsoidal approximation to the limit surface that gives a simple analytical representation of the limit surface.

Example: Contact State Control

Each primitive assumes a particular contact condition between the end effectors and the object. This assumption is likely to be broken as unmodeled perturbations are applied on the system and cause undesired slippage. A contact state controller may act to enforce the planned contact modes by reacting to a binary incipient slip signal $s_i \in \{0,1\}$ at contact i.

Coulomb friction states that slippage occurs when the contact force lies on the boundary of the friction cone, as shown in FIG. 8. Given an undesired slippage signal, local end effector configuration and force adjustments that result in a more stable sticking solution (i.e., contact forces 802 nearer to the center of the friction cone 800) may be found. The stability margin 804 in FIG. 8 is defined as the shortest distance from the contact force to the friction cone boundary and evaluates the risk of slipping of a particular contact. The goal of the controller is to find robot adjustments that either maximize (for sticking) or minimize (for sliding) the stability margin of a contact to enforce a desired contact mode. As described herein, manipulation primitives that restrict to sticking contacts between the gripper and the object may be developed.

Given the slippage signal $s_i \in \{0,1\}$ at each contact and the current robot pose configuration $q_p=[p_{p,l}^T \ p_{p,r}^T]^T$, an end effector pose adjustment $\Delta q_p$ and contact force $w_i$ that maximize the stability margin of a particular contact i (indicated by the weight $\beta_i$) may be searched for by solving:

$$\max_{\Delta q_p, w_i} \beta_i \varphi_i \qquad (4)$$

$$\text{s.t.} \sum_{i=1}^{C} G_i (q_p + \Delta q_p)^T w_i = w_{ext}$$

$$f_{n,i} \geq 0$$

$$\|f_{t,i}\|_2 \leq \mu |f_{n,i}|$$

with $G_i$, $q_p$, $w_{ext}$ as defined above (see "Example: Mechanics of Manipulation Primitives") and where p is the stability margin 804 shown in FIG. 8. The notation $q_p+\Delta q_p$ is abused here for simplicity, where we ensure that $q_p+\Delta q_p$ belongs to SE(3) and does not violate the kinematics (i.e., maintaining contact and non-penetration) of the contact condition. For example, in FIG. 3C, the end effectors can press harder and/or pivot about the contact edge. The parameter $\beta_i$ is a weight used to bias the effort of the regulating behavior to contact i based on the slip signal $s_i$.

The optimization program in equation (4) is non-convex because φ is nonlinear and because the constraint associated with static equilibrium is bilinear. The surrogate stability margin 806 illustrated in FIG. 8 may be a convex approximation to φ. The optimization program is then relaxed using the surrogate margin and the static equilibrium equation (1) is linearized about the current robot configuration $q_p^*$ and contact forces $f_{n,i}^*$ $f_{t,i}^*$ for computational efficiency. The linearized contact state controller becomes:

$$\max_{\Delta q_p, w_i, \alpha_i} \beta_i \alpha_i \qquad (5)$$

$$\text{s.t.} \sum_{i=1}^{C} \left( \frac{\partial (G_i w_i)}{\partial q_p} \bigg|_* \Delta q_p + \frac{\partial (G_i w_i)}{\partial w_i} \bigg|_* \Delta w_i \right) = w_{ext}$$

$$f_{n,i} \geq 0$$

$$\alpha_i \geq 0$$

$$\|f_{t,i}\|_2 \leq \mu f_{n,i}$$

$$\|f_{t,i}\|_2 \leq \mu |f_{n,i} - \alpha_i|$$

where the symbol $(\bullet)^*$ is used to evaluate a term at the nominal configuration. Note that the surrogate margin α (corresponding to 804 in FIG. 8) is not invariant to scale, i.e., margin could be artificially increased simply by scaling up the magnitude of all the forces. To regulate this behavior, in practice, bound constraints may be added to the allowable $\Delta q$ and $\Delta q$. The optimization program in equation (5) takes the form of a convex quadratic program under a polyhedral approximation to the friction cone.

Example: Object State Control

The contact state controller described above (see "Example: Contact State Control") regulates the applied forces on the object to enforce a desired contact mode. This tactile controller reacts to fight against external perturbations but may not have the ability to change the planed trajectory of the object in response to a perturbation. To address this, an object state controller running in parallel may be used. The object state controller may be tasked with replanning object/palm trajectories to drive the object to its target location.

Tracking of two types of features are described herein: points (e.g., corners of the object) and lines (e.g., edges of the object). However, it should be appreciated that other types of features may be tracked, and the disclosure is not limited to points and lines. The tactile object state estimator may be formulated as an optimization program that updates the pose $p_o$ of the object to satisfy the geometric constraints associated with the tactile features. The error between the previous and the updated pose estimate may be quantified using the distance $d_{TS}(p_o, p_o^*)$, where $d_{TS}$ is defined as the weighted sum of the Euclidean metric in $R^3$ and the great circle angle metric in SO(3) for the respective components. Detected lines may be enforced to be collinear with their associated edge on the object mesh and the sensed points may be enforced to be coincident with the object corner. In addition to the detected geometric constraint, the estimated object pose may be constrained to satisfy the geometric constraints consistent with the current manipulation primitive. For example, for a pull primitive, the bottom surface of the object may be constrained to be in contact and aligned with a tabletop.

The estimated object pose may be used to update the nominal robot end effector pose trajectory, which allows the robot to adapt to local object perturbations.

Example: Experimental Results

The focus of the experiments described in this example was to evaluate the robustness of the system to external perturbations and to uncertainty in the initial pose of the object.

The approach to tactile-based manipulation described herein was evaluated on a dual-arm robot. The ability of the tactile controller to handle external perturbations on a tabletop manipulation task was evaluated.

One experiment included a robot manipulating an object from an initial pose $q_0 = [0.3, -0.2, 0.07, 0.38, 0.60, 0.60, 0.38]^T$ to a target pose $q_f = [0.45, 0.3, 0.045, 0.0, 0.71, 0.0, 0.71]^T$ on a tabletop. To achieve the task, the robot executed the following sequence: pull the object to the middle of the table, pivot the object to its target placement, and push the object to its target location. The initial pull primitive was used to move the object to a location that allowed the robot to perform a pivot maneuver with well-defined inverse kinematics and that avoided collisions with the environment.

The closed-loop performance of the tactile controller was evaluated on individual primitives. A regulation task includes maintaining an object in a stationary pose for the pull and grasp primitives. The regulation task allows better visualization of the reactive capabilities of the controller without loss of generality. In each experiment (i.e., for each of the pull primitive and the grasp primitive), two successive impulsive forces were applied on the object and the stabilizing capabilities of the tactile controller was evaluated. In both cases, the controller quickly reacted to the disturbance by detecting slippage events at the contact interfaces and then tracking the pose of the object using the detected object edge in the tactile signal. First, the applied normal force was increased in reaction to the detected slippage at the contact interface. Second, the robot replanned its trajectory from updates on the object state, quickly returning to its nominal pose. For evaluation purposes, the ground truth pose of the object was tracked using an Apriltag visual marker.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

What is claimed is:

1. A method of manipulating an object based on tactile sensing, the method comprising:
    sensing an object by receiving signals from a tactile sensor of an end effector of a robotic system in contact with the object;
    controlling a contact state by operating the end effector to enforce a desired contact condition between the end effector and the object;
    estimating a pose of the object based on the received signals; and
    planning at least one trajectory of the object based on the estimated pose of the object and a desired pose of the object, wherein the at least one trajectory is configured to move the object to the desired pose;
    manipulating the object with the end effector according to the at least one trajectory to move the object to the desired pose;
    continuing to estimate the pose of the object and the contact state during manipulation of the object as the object is moved to the desired pose; and
    updating the at least one trajectory based on a change in the estimated pose and/or the contact state relative to the end effector during manipulation of the object as the object is moved to the desired pose, wherein the updated at least one trajectory is configured to move the object to the desired pose.

2. The method of claim 1, wherein the steps of sensing the object, controlling the contact state, estimating the pose, planning the at least one trajectory, and manipulating the object are performed iteratively as the object is moved to the desired pose.

3. The method of claim 1, wherein controlling the contact state by operating the end effector to enforce the desired contact condition comprises controlling the contact state by operating the end effector to enforce one or more selected from a group of a contact/no-contact condition and a stick/slip condition.

4. The method of claim 1, wherein controlling the contact state comprises:
    monitoring slippage between the object and the end effector; and
    adjusting the contact state based on the monitored slippage.

5. The method of claim 4, wherein:
    sensing the object by receiving signals from the tactile sensor comprises sensing the object by receiving a plurality of frames from an optical-based tactile sensor, and
    monitoring the slippage between the object and the end effector comprises comparing two or more frames of the plurality of frames.

6. The method of claim 4, wherein adjusting the contact state comprises one or more selected from a group comprising adjusting a magnitude of an applied force between the end effector and the object and adjusting a direction of the applied force.

7. The method of claim 1, wherein estimating the pose of the object comprises tracking at least one geometric feature of the object in real time.

8. The method of claim 7, wherein tracking the at least one geometric feature of the object in real time comprises tracking one or more selected from a group of an edge of the object and a corner of the object in real time.

9. The method of claim 1, wherein planning the at least one trajectory of the object comprises planning one or more selected from a group of an end effector trajectory and a robot trajectory.

10. The method of claim 1, wherein planning the at least one trajectory of the object comprises planning at least one trajectory that comprises at least one manipulation primitive.

11. The method of claim 10, wherein planning the at least one trajectory that comprises at least one manipulation primitive comprises planning at least one trajectory that comprises one or more selected from a group of a grasp, a push, a pivot, and a pull.

12. The method of claim 10, wherein planning the at least one trajectory that comprises at least one manipulation primitive comprises planning at least one trajectory that comprises a sequence of manipulation primitives to achieve a task.

13. The method of claim 1, wherein updating the at least one trajectory based on the change in the estimated pose and/or the contact state relative to the end effector includes updating the at least one trajectory based on the change in the estimated pose.

14. A robotic system comprising:
at least one end effector comprising at least one tactile sensor, wherein the at least one end effector is configured to manipulate an object; and
at least one processor operatively coupled to the at least one tactile sensor, wherein the at least one processor is configured to:
receive signals from the at least one tactile sensor;
control a contact state by operating the at least one end effector to enforce a desired contact condition between the end effector and the object;
estimate a pose of the object based on the received signals; and
plan at least one trajectory of the object based on the estimated pose of the object and a desired pose of the object, wherein the at least one trajectory is configured to move the object to the desired pose;
manipulate the object with the end effector according to the at least one trajectory;
continue to estimate the pose of the object and the contact state during manipulation of the object as the object is moved to the desired pose; and
update the at least one trajectory based on a change in the estimated pose and/or the contact state relative to the end effector during manipulation of the object as the object is moved to the desired pose, wherein the updated at least one trajectory is configured to move the object to the desired pose.

15. The robotic system of claim 14, wherein the at least one processor is configured to control the contact state by operating the at least one end effector to enforce one or more selected from a group of a contact/no-contact condition and a stick/slip condition.

16. The robotic system of claim 14, wherein the at least one processor is configured to monitor slippage between the object and the at least one end effector, and wherein the at least one processor is configured to operate the at least one end effector to adjust the contact state based on the monitored slippage.

17. The robotic system of claim 16, wherein:
the at least one tactile sensor comprises at least one optical-based tactile sensor;
the at least one processor is configured to receive a plurality of frames from the optical-based tactile sensor; and
the at least one processor is configured to compare two or more frames of the plurality of frames.

18. The robotic system of claim 16, wherein the at least one processor is configured to operate the at least one end effector to adjust one or more selected from a group comprising a magnitude of an applied force between the end effector and the object and a direction of the applied force.

19. The robotic system of claim 14, further comprising:
at least one limb, wherein the at least one end effector is operatively coupled to a distal portion of the at least one limb; and
at least one actuator associated with the at least one limb, wherein the at least one processor is operatively coupled to the at least one actuator.

20. The robotic system of claim 19, wherein:
the at least one limb comprises two limbs,
the at least one end effector comprises two end effectors, and
the at least one tactile sensor comprises two tactile sensors.

21. The robotic system of claim 14, wherein the at least one tactile sensor comprises at least one optical-based tactile sensor.

22. The robotic system of claim 21, wherein the at least one optical-based tactile sensor comprises at least one GelSlim sensor.

23. The robotic system of claim 21, wherein the at least one optical-based tactile sensor is configured to sense a contact strain field.

24. The robotic system of claim 14, wherein the at least one tactile sensor comprises an elastomeric contact surface.

25. The robotic system of claim 14, wherein the at least one tactile sensor comprises a planar contact surface.

26. At least one non-transitory computer-readable storage medium having encoded thereon executable instructions that, when executed, cause at least one processor to carry out a method of manipulating an object based on tactile sensing, the method comprising:
sensing an object by receiving signals from a tactile sensor of an end effector of a robotic system in contact with the object;
controlling a contact state by operating the end effector to enforce a desired contact condition between the end effector and the object;
estimating a pose of the object based on the received signals; and
planning at least one trajectory of the object based on the estimated pose of the object and a desired pose of the object, wherein the at least one trajectory is configured to move the object to the desired pose;
manipulating the object with the end effector according to the at least one trajectory to move the object to the desired pose;
continuing to estimate the pose of the object and the contact state during manipulation of the object as the object is moved to the desired pose; and
updating the at least one trajectory based on a change in the estimated pose and/or the contact state relative to the end effector during manipulation of the object as the object is moved to the desired pose, wherein the updated at least one trajectory is configured to move the object to the desired pose.

27. The computer-readable storage medium of claim 26, wherein the method further comprises manipulating the object with the end effector according to the at least one trajectory.

28. The computer-readable storage medium of claim 27, wherein the steps of sensing the object, controlling the contact state, estimating the pose, planning the at least one trajectory, and manipulating the object are performed iteratively as the object is moved to the desired pose.

29. The computer-readable storage medium of claim 26, wherein controlling the contact state by operating the end effector to enforce the desired contact condition comprises controlling the contact state by operating the end effector to enforce one or more selected from a group of a contact/no-contact condition and a stick/slip condition.

30. The computer-readable storage medium of claim 26, wherein controlling the contact state comprises:
monitoring slippage between the object and the end effector; and
adjusting the contact state based on the monitored slippage.

31. The computer-readable storage medium of claim 30, wherein:
  sensing the object by receiving signals from the tactile sensor comprises sensing the object by receiving a plurality of frames from an optical-based tactile sensor, and
  monitoring the slippage between the object and the end effector comprises comparing two or more frames of the plurality of frames.

32. The computer-readable storage medium of claim 30, wherein adjusting the contact state comprises one or more selected from a group comprising adjusting a magnitude of an applied force between the end effector and the object and adjusting a direction of the applied force.

33. The computer-readable storage medium of claim 26, wherein estimating the pose of the object comprises tracking at least one geometric feature of the object in real time.

34. The computer-readable storage medium of claim 33, wherein tracking the at least one geometric feature of the object in real time comprises tracking one or more selected from a group of an edge of the object and a corner of the object in real time.

35. The computer-readable storage medium of claim 26, wherein planning the at least one trajectory of the object comprises planning one or more selected from a group of an end effector trajectory and a robot trajectory.

36. The computer-readable storage medium of claim 26, wherein planning the at least one trajectory of the object comprises planning at least one trajectory that comprises at least one manipulation primitive.

37. The computer-readable storage medium of claim 36, wherein planning the at least one trajectory that comprises at least one manipulation primitive comprises planning at least one trajectory that comprises one or more selected from a group of a grasp, a push, a pivot, and a pull.

38. The computer-readable storage medium of claim 36, wherein planning the at least one trajectory that comprises at least one manipulation primitive comprises planning at least one trajectory that comprises a sequence of manipulation primitives to achieve a task.

* * * * *